(12) United States Patent
Kang et al.

(10) Patent No.: US 12,509,155 B2
(45) Date of Patent: Dec. 30, 2025

(54) VEHICLE CENTER FRAME MODULE

(71) Applicants: Hyundai Motor Company, Seoul (KR); Kia Corporation, Seoul (KR)

(72) Inventors: Jeon Woong Kang, Hwaseong-si (KR); Huen Sick Min, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 610 days.

(21) Appl. No.: 17/748,867

(22) Filed: May 19, 2022

(65) Prior Publication Data

US 2023/0144195 A1   May 11, 2023

(30) Foreign Application Priority Data

Nov. 9, 2021   (KR) .................. 10-2021-0153397

(51) Int. Cl.
| | | |
|---|---|---|
| *B62D 25/02* | (2006.01) | |
| *B60K 1/04* | (2019.01) | |
| *B62D 21/02* | (2006.01) | |
| *B62D 27/02* | (2006.01) | |
| *B62D 29/00* | (2006.01) | |
| *H01M 50/249* | (2021.01) | |
| *H01M 50/262* | (2021.01) | |

(52) U.S. Cl.
CPC .............. *B62D 25/025* (2013.01); *B60K 1/04* (2013.01); *B62D 21/02* (2013.01); *B62D 27/023* (2013.01); *B62D 29/007* (2013.01); *H01M 50/249* (2021.01); *H01M 50/262* (2021.01); *B60K 2001/0438* (2013.01); *H01M 2220/20* (2013.01)

(58) Field of Classification Search
CPC ............ B60K 2001/0438; B62D 21/02; B62D 25/025
See application file for complete search history.

(56) References Cited

U.S. PATENT DOCUMENTS

| | | | | |
|---|---|---|---|---|
| 5,352,011 | A * | 10/1994 | Kihara ................... | B62D 25/06 |
| | | | | 296/203.03 |
| 6,234,568 | B1 * | 5/2001 | Aoki ..................... | B62D 29/008 |
| | | | | 296/205 |
| 7,731,274 | B2 * | 6/2010 | Kishima ................ | B62D 27/04 |
| | | | | 296/203.03 |
| 8,960,781 | B2 | 2/2015 | Rawlinson et al. | |
| 9,505,442 | B2 | 11/2016 | Wu et al. | |
| 9,623,742 | B2 * | 4/2017 | Ikeda .................. | B62D 25/2036 |
| 10,486,746 | B2 * | 11/2019 | Kawabe ................... | B60K 1/04 |

(Continued)

FOREIGN PATENT DOCUMENTS

| | | | | |
|---|---|---|---|---|
| CN | 211844649 U | * | 11/2020 | ............. B60R 16/04 |
| DE | 102019118877 A1 | * | 1/2020 | ............... B60K 1/04 |

(Continued)

*Primary Examiner* — Emma K Frick
(74) *Attorney, Agent, or Firm* — Slater Matsil, LLP

(57) ABSTRACT

A vehicle center frame module includes a pair of side sills, each side sill including a side sill inner having a closed cross section and a side sill outer having a closed cross section, wherein an inboard side surface of the side sill outer and an outboard side surface of the side sill inner are joined, and a plurality of crossmembers connecting the pair of side sills in a transverse direction of a vehicle, the crossmembers including a first crossmember and a second crossmember disposed behind the first crossmember in a longitudinal direction of the vehicle.

20 Claims, 8 Drawing Sheets

(56) References Cited

U.S. PATENT DOCUMENTS

| | | | |
|---|---|---|---|
| 10,661,840 B1* | 5/2020 | Saje | B62D 25/2018 |
| 10,913,340 B2* | 2/2021 | Tsuyuzaki | B60K 1/04 |
| 11,124,245 B2* | 9/2021 | Grottke | B62D 21/157 |
| 11,318,992 B2 | 5/2022 | Sasaoka | |
| 11,524,726 B2* | 12/2022 | Fujisawa | B60K 1/04 |
| 11,654,974 B2* | 5/2023 | Choi | B62D 25/2036 |
| | | | 296/193.05 |
| 11,820,432 B2* | 11/2023 | Kamei | B60K 1/04 |
| 11,827,280 B2* | 11/2023 | Kang | B62D 25/082 |
| 12,084,113 B2* | 9/2024 | Kang | B62D 25/08 |
| 2017/0217498 A1 | 8/2017 | Akhlaque-e-rasul et al. | |
| 2018/0236863 A1* | 8/2018 | Kawabe | B60K 1/04 |
| 2020/0031399 A1* | 1/2020 | Matsuda | B62D 25/2036 |
| 2021/0039716 A1 | 2/2021 | Sasaoka | |
| 2023/0143298 A1* | 5/2023 | Kang | B62D 27/02 |
| | | | 296/193.05 |
| 2024/0017770 A1* | 1/2024 | Yoshida | B60L 3/0007 |

FOREIGN PATENT DOCUMENTS

| | | | |
|---|---|---|---|
| JP | 2014080117 A | 5/2014 |
| JP | 2016097851 A | 5/2016 |
| JP | 6794792 B2 | 12/2020 |
| JP | 2021024559 A | 2/2021 |

\* cited by examiner

VEHICLE CENTER FRAME MODULE

CROSS-REFERENCE TO RELATED APPLICATIONS

This application claims the benefit of Korean Patent Application No. 10-2021-0153397, filed on Nov. 9, 2021, which application is hereby incorporated herein by reference.

TECHNICAL FIELD

The present disclosure relates to a vehicle center frame module.

BACKGROUND

A vehicle frame, which is a structure designed to install chassis components or a vehicle body, should be sufficiently protected from local or overall damages due to deformation, torsion, tension, compression, and/or vibration caused by the vehicle's propulsion force, brake action, a centrifugal force during steering, an impact from a road surface, a vertical load due to the weight of the vehicle body, and various reaction forces. It should be of a structure that can sufficiently absorb impact energy applied to the vehicle in the event of a collision.

Due to diversification of the vehicle market, the vehicle frame is being changed in various ways from an existing monocoque structure to a novel structure such as a purpose built vehicle (PBV) frame and a space frame, to meet each vehicle's purpose. In particular, a low-cost electric vehicle (EV) requires a vehicle body structure which is created by breaking an existing method in order to maximize profitability.

Existing vehicles use pressed steel materials and aluminum materials for the frame, and thus the material cost and investment cost thereof may be relatively high.

In addition, since a joint portion between structural members constituting the existing vehicle frame is made by welding, the joint portion between the structural members may be easily damaged by an impact load during a side collision of the vehicle. In addition, it may be difficult to uniformly distribute a load transferred from the front of the vehicle body. Thus, it may be difficult to safely protect a passenger compartment and a battery.

The above information described in this background section is provided to assist in understanding the background of the inventive concept, and may include any technical concept which is not considered as the prior art that is already known to those skilled in the art.

SUMMARY

The present disclosure relates to a vehicle center frame module. Particular embodiments relate to a vehicle center frame module that can significantly improve side crash performance (crashworthiness) of a vehicle.

Embodiments of the present disclosure can solve problems occurring in the prior art while advantages achieved by the prior art are maintained intact.

An embodiment of the present disclosure provides a vehicle center frame module using a relatively inexpensive material such as a mass-produced steel pipe, thereby significantly reducing the manufacturing cost thereof, compared to when using pressed steel materials and aluminum materials, and significantly improving side crash performance (crashworthiness) of a vehicle, thereby safely protecting a battery and a passenger compartment.

According to an embodiment of the present disclosure, a vehicle center frame module may include a pair of side sills and two or more crossmembers connecting the pair of side sills in a transverse direction of the vehicle. Each side sill may include a side sill inner having a closed cross section and a side sill outer having a closed cross section, and an inboard side surface of the side sill outer and an outboard side surface of the side sill inner may be joined. The crossmembers may include a first crossmember and a second crossmember located behind the first crossmember.

Each of the side sill inner and the side sill outer may have a closed cross section, and a cavity of the side sill outer may be separated from a cavity of the side sill inner. That is, the side sill may have a double closed cross section through the two separated cavities, thereby enhancing strength and stiffness thereof. Thus, side crashworthiness of the vehicle may be improved so that the battery and the passenger compartment may be safely protected.

The side sill inner may be made of a material having higher strength and stiffness than that of the side sill outer.

As the material of the side sill inner has higher strength and stiffness than the material of the side sill outer, side stiffness of the center frame module may be significantly improved.

Specifically, the side sill inner may be made of a high-tensile strength steel plate.

Accordingly, the side sills may have improved side crashworthiness, thereby safely protecting the battery and the passenger compartment.

A cross-sectional area of the side sill inner may be greater than a cross-sectional area of the side sill outer.

Accordingly, the strength and stiffness of the side sill inner may be greater than the strength and stiffness of the side sill outer. When a side impact load is applied to the side sill, the side sill inner may sufficiently withstand the impact load.

The side sill inner and the side sill outer may be joined to form a stepped structure.

Accordingly, a vertical height of the side sill may be relatively increased, thereby stably covering the side impact load applied to the side sill.

A bottom surface of the side sill outer may be located lower than a bottom surface of the side sill inner.

Accordingly, the side sill inner and the side sill outer may more safely protect a battery case located under the center frame module in the event of a side collision of the vehicle.

The side sill may further include a rivet nut for mounting a battery assembly, and the rivet nut may extend through the side sill inner.

The rivet nut may extend through the side sill inner, thereby stably securing mounting stiffness of the battery assembly.

The rivet nut may include a nut body extending through the side sill inner, a top head provided on a top end of the nut body, and a bottom head provided on a bottom end of the nut body.

Accordingly, the rivet nut having the top head and the bottom head may be firmly mounted in the side sill inner of the side sill, thereby improving assembly of the battery assembly and sufficiently securing the mounting stiffness of the battery assembly.

The nut body may have internal threads provided on an inner circumferential surface thereof, the top head may be supported and joined to a top surface of the side sill inner, and the bottom head may be supported and joined to a bottom surface of the side sill inner.

The top head may apply an external force to the top surface of the side sill inner in a vertical downward direction, and the bottom head may apply an external force to the bottom surface of the side sill inner in a vertical upward direction so that the rivet nut may be quite firmly mounted in the side sill inner.

Both end portions of each crossmember may be coupled to the pair of side sills through a pair of support brackets, respectively.

Accordingly, each end portion of each crossmember may be more firmly supported and joined to the corresponding side sill through the corresponding support bracket.

Each support bracket may include a first fixed surface which is fixed to the crossmember, and a second fixed surface which is fixed to the side sill inner. The first fixed surface may be perpendicular to the second fixed surface.

Accordingly, each crossmember may be firmly supported to the side sill inner of the corresponding side sill through the support bracket.

The support bracket may further include an inclined surface extending obliquely between the first fixed surface and the second fixed surface.

Accordingly, each crossmember may be stably supported to the side sill through the inclined surface of the support bracket.

Each crossmember may be made of a high-tensile strength steel plate.

As the crossmember is made of a high-tensile strength steel plate, the side crashworthiness of the side sill may be improved, thereby safely protecting the battery and the passenger compartment in the event of a side collision of the vehicle.

The vehicle center frame module may further include two or more side longitudinal members connected perpendicularly to the two or more crossmembers.

The side longitudinal members may include a pair of first side longitudinal members extending from the first crossmember to the second crossmember, and a pair of second side longitudinal members extending from the second crossmember toward the rear of the vehicle.

Each second side longitudinal member may be aligned with a corresponding first side longitudinal member in a longitudinal direction of the vehicle.

The plurality of side longitudinal members may be connected perpendicularly to the plurality of crossmembers so that static stiffness and dynamic stiffness of the center frame module may be increased. In particular, during a side collision of the vehicle, an impact load may be transferred along the plurality of crossmembers through the side sill in the transverse direction of the vehicle, and the impact load may be transferred through the plurality of side longitudinal members connected perpendicularly to the plurality of crossmembers in the longitudinal direction of the vehicle so that the load may be uniformly distributed in the center frame module.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
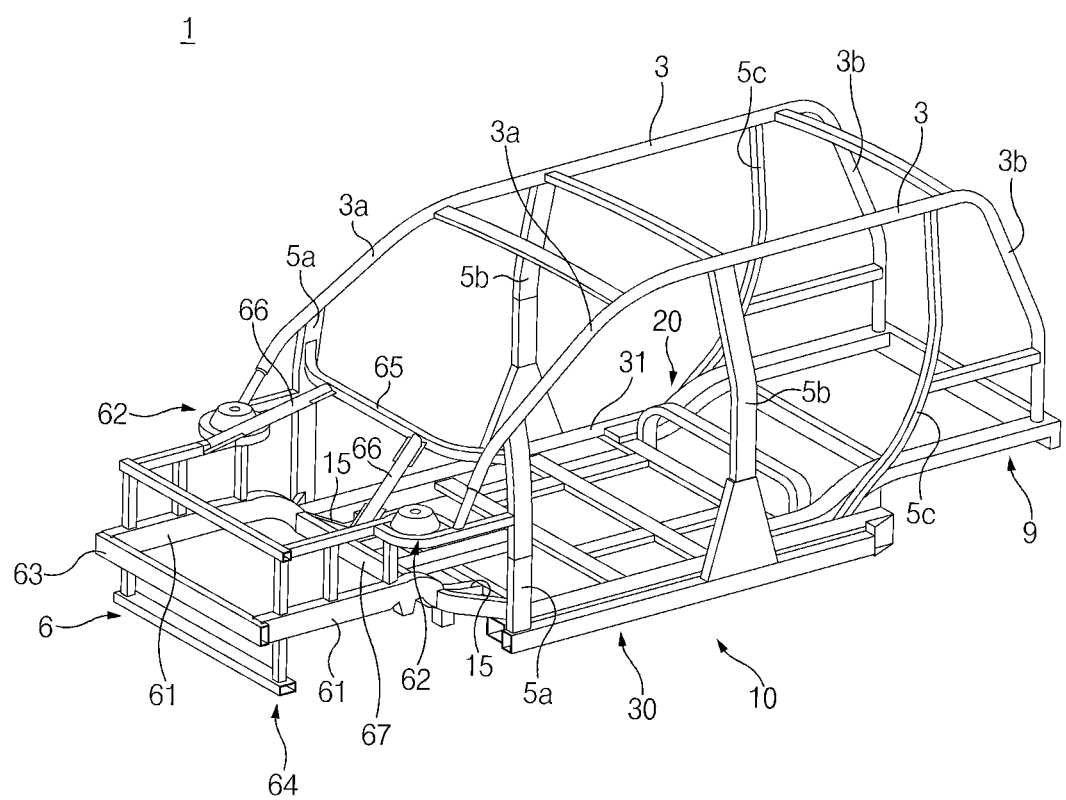
FIG. 1 illustrates a vehicle frame to which a vehicle center frame module according to an exemplary embodiment of the present disclosure is applied.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a vehicle frame 1 to which a vehicle center frame module according to an exemplary embodiment of the present disclosure is applied.

Referring to FIG. 1, the vehicle frame 1 may include a center frame module 10, a front structure 6 connected to the front of the center frame module 10, a rear frame module 9 connected to the rear of the center frame module 10, and an intermediate structure 20 disposed between the center frame module 10 and the rear frame module 9.

A pair of front pillars 5a may extend from the front of the center frame module 10 in a height direction of the vehicle, and the pair of front pillars 5a may be spaced apart from each other in a transverse direction of the vehicle.

A pair of center pillars 5b may extend from the center of the center frame module 10 in the height direction of the vehicle, and the pair of center pillars 5b may be spaced apart from each other in the transverse direction of the vehicle.

A pair of rear pillars 5c may extend from the rear of the center frame module 10 in the height direction of the vehicle, and the pair of rear pillars 5c may be spaced apart from each other in the transverse direction of the vehicle.

A pair of roof rails 3 may be disposed above the center frame module 10, and each roof rail 3 may extend in a longitudinal direction of the vehicle. Each roof rail 3 may connect a top end of the corresponding front pillar 5a, a top end of the corresponding center pillar 5*b*, and a top end of the corresponding rear pillar 5*c*. Each roof rail 3 may have a front extension portion 3*a* extending obliquely from a front end thereof, and a rear extension portion 3*b* extending obliquely from a rear end thereof.

Figure 2:
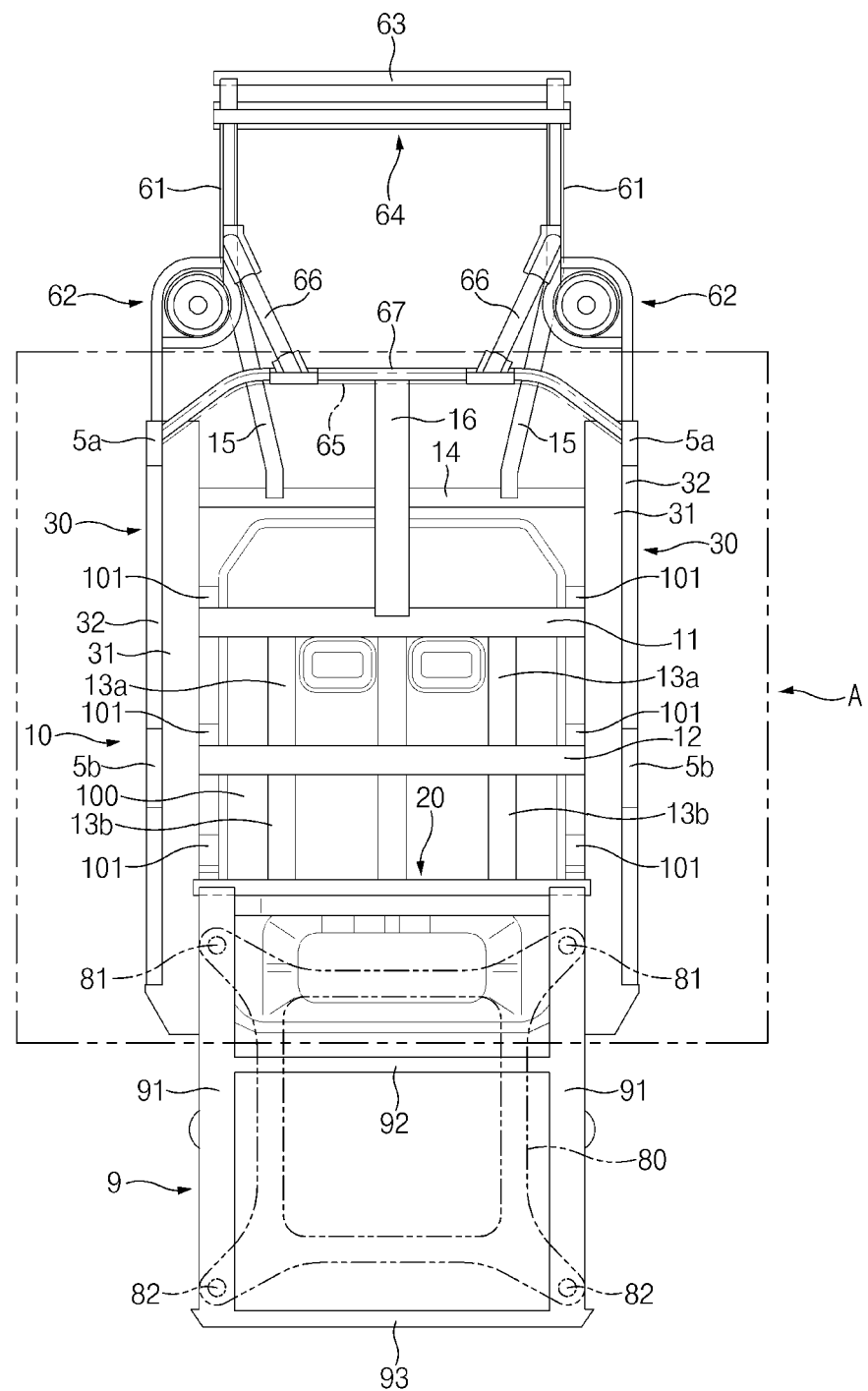
FIG. 2 illustrates a plan view of the vehicle frame illustrated in FIG. 1, from which a pair of roof rails are removed.
Figure 3:
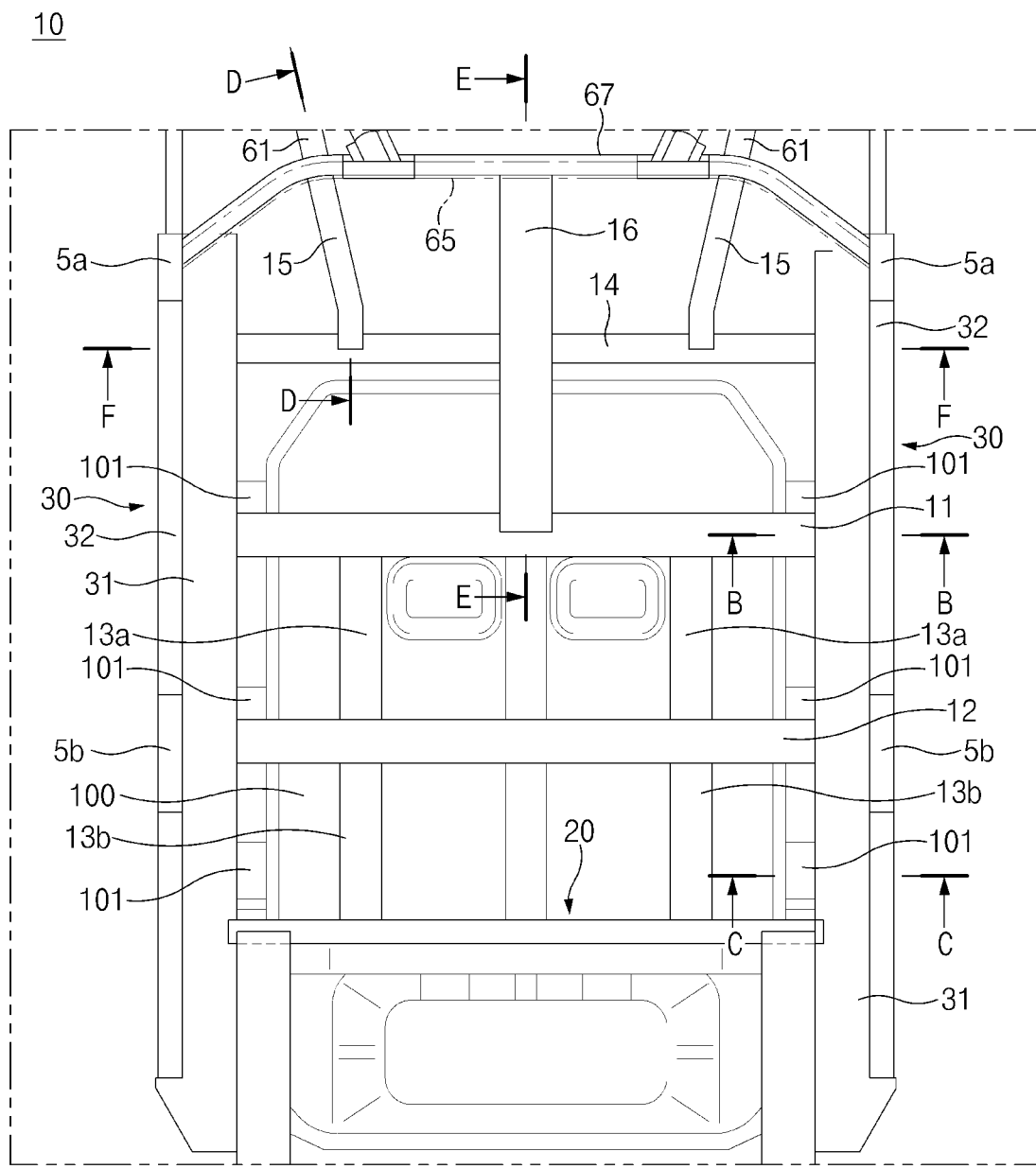
FIG. 3 illustrates an enlarged view of portion A of FIG. 2.

Referring to FIGS. 2 and 3, the center frame module 10 may include a pair of side sills 30 disposed on both side edges thereof, a plurality of crossmembers 11 and 12 connecting the pair of side sills 30 in the transverse direction of the vehicle, and a plurality of side longitudinal members 13*a* and 13*b* connected perpendicularly to the plurality of crossmembers 11 and 12.

The pair of side sills 30 may be spaced apart from each other in the transverse direction of the vehicle, and each side sill 30 may extend in the longitudinal direction of the vehicle. Referring to FIGS. 2 and 3, the side sill 30 may include a side sill inner 31 facing the interior of the vehicle, and a side sill outer 32 facing the exterior of the vehicle.

The side sill inner 31 may have an angular cross section or a circular cross section with a cavity defined therein, and accordingly the side sill inner 31 may have a closed cross section.

An inboard side surface of the side sill outer 32 may be fixed to an outboard side surface of the side sill inner 31 using fasteners, welding, and/or the like. The side sill outer 32 may be made of a mass-produced steel pipe having an angular cross section or a circular cross section with a cavity defined therein, and accordingly the side sill outer 32 may have a closed cross section. For example, the mass-produced steel pipe may be SGH400, SGH490, or the like.

Each of the side sill inner 31 and the side sill outer 32 may have a closed cross section, and the cavity of the side sill outer 32 may be separated from the cavity of the side sill inner 31. Since the cavity of the side sill inner 31 and the cavity of the side sill outer 32 are separated from each other, the side sill 30 may have a double closed cross section, thereby enhancing strength and stiffness thereof.

The side sill inner 31 may be made of a material having higher strength and stiffness than a material of the side sill outer 32. As the material of the side sill inner 31 has higher strength and stiffness than the material of the side sill outer 32, side stiffness of the center frame module 10 may be significantly improved.

According to an exemplary embodiment, the side sill inner 31 may be made of a high-tensile strength steel plate such as SPFC1180Y through hot stamping, hot forming, press hardening, and/or roll forming. Accordingly, side crash performance (crashworthiness) of the side sills 30 may be improved so that a battery and a passenger compartment may be safely protected in the event of a side collision.

The cross-sectional areas and thicknesses of the side sill inner 31 and the side sill outer 32 may be determined to have the same or similar moment of inertia compared to an existing side sill according to the related art.

Figure 4:
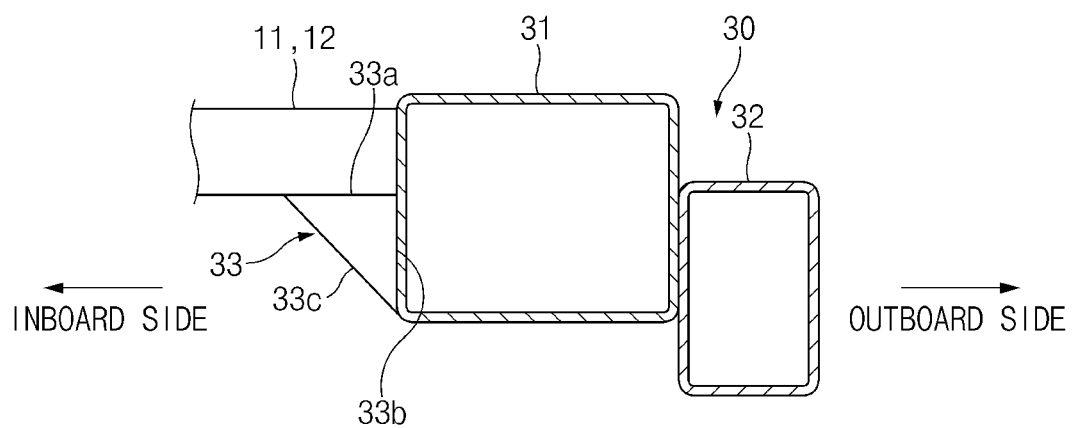
FIG. 4 illustrates a cross-sectional view, taken along line B-B of FIG. 3.
Figure 5:
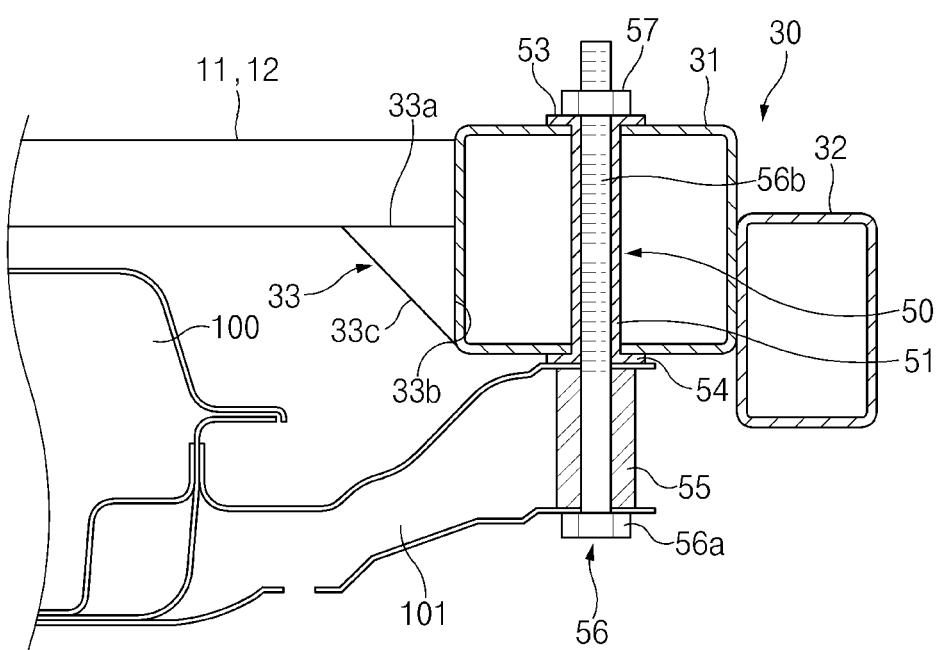
FIG. 5 illustrates a cross-sectional view, taken along line C-C of FIG. 3.

According to an exemplary embodiment, as illustrated in FIGS. 3 and 4, the cross-sectional area of the side sill inner 31 may be greater than the cross-sectional area of the side sill outer 32. In addition, the thickness of the side sill inner 31 may be greater than the thickness of the side sill outer 32.

The side sill inner 31 and the side sill outer 32 may be joined to form a stepped structure. Referring to FIGS. 3 and 4, a bottom surface of the side sill outer 32 may be located lower than a bottom surface of the side sill inner 31. Accordingly, the side sill inner 31 and the side sill outer 32 may more safely protect a battery case 100 located under the center frame module 10 in the event of a side collision of the vehicle.

Each side edge of an upper body may be directly mounted on the side sill outer 32 of the corresponding side sill 30. Referring to FIGS. 3 and 4, a top surface of the side sill outer 32 may be located lower than a top surface of the side sill inner 31, and accordingly a mounting space of the upper body may be sufficiently secured.

Referring to FIGS. 2 and 3, a battery assembly may be disposed under the vehicle frame 1. The battery assembly may include the battery case 100, and a plurality of battery mounts 101 extending from both side edges of the battery case 100 in a direction parallel to the transverse direction of the vehicle.

The side sill 30 may further include a rivet nut 50 for mounting the battery assembly. The rivet nut 50 may extend vertically through the side sill inner 31. Specifically, the rivet nut 50 may include a nut body 51 extending through the cavity of the side sill inner 31, a top head 53 provided on a top end of the nut body 51, and a bottom head 54 provided on a bottom end of the nut body 51.

The rivet nut 50 having the top head 53 and the bottom head 54 may be firmly mounted in the side sill inner 31 of the side sill 30, thereby improving assembly of the battery assembly and sufficiently securing mounting stiffness of the battery assembly.

The nut body 51 may have internal threads provided on an inner circumferential surface thereof, and the nut body 51 may extend through the top surface and bottom surface of the side sill inner 31. The top head 53 may be supported and joined to the top surface of the side sill inner 31, and the bottom head 54 may be supported and joined to the bottom surface of the side sill inner 31. The top head 53 may apply an external force to the top surface of the side sill inner 31 in a vertical downward direction, and the bottom head 54 may apply an external force to the bottom surface of the side sill inner 31 in a vertical upward direction so that the rivet nut 50 may be firmly mounted in the side sill inner 31. For example, the rivet nut 50 may be riveted to the side sill inner 31 through a nut riveter or the like.

Each battery mount 101 may extend from each side edge of the battery case 100 toward the side sill inner 31, each battery mount 101 may have a mounting pipe 55 provided on an end portion thereof, and the mounting pipe 55 may be aligned with the rivet nut 50 of the side sill inner 31. Specifically, a central longitudinal axis of the mounting pipe 55 may be aligned with a central longitudinal axis of the rivet nut 50. The mounting pipe 55 may not have any internal threads therein.

A mounting bolt 56 may be mounted into the mounting pipe 55 of the battery mount 101 and the rivet nut 50 of the side sill inner 31. The mounting bolt 56 may have a head 56*a* and external threads 56*b*, and the head 56*a* may be supported to a bottom surface of the battery mount 101. The external threads 56*b* of the mounting bolt 56 may be screwed into the internal threads of the nut body 51 of the rivet nut 50 through the mounting pipe 55. Accordingly, the mounting bolt 56 may be firmly mounted into the mounting pipe 55 and the rivet nut 50, thereby sufficiently securing the mounting stiffness of the battery assembly.

The plurality of crossmembers 11 and 12 may include a first crossmember 11 and a second crossmember 12 located behind the first crossmember 11.

The first crossmember 11 may extend in the transverse direction of the vehicle, and the second crossmember 12 may extend in the transverse direction of the vehicle. The first crossmember 11 may be parallel to the second crossmember 12. The second crossmember 12 may be spaced apart from the first crossmember 11 toward the rear of the vehicle. The first crossmember 11 and the second crossmember 12 may be located in the middle of the center frame module 10.

Each end portion of the first crossmember 11 may be joined to the corresponding side sill 30 using fasteners, welding, and/or the like, and accordingly the first crossmember 11 may connect the pair of side sills 30 in the transverse direction of the vehicle.

Each end portion of the second crossmember 12 may be joined to the corresponding side sill 30 using fasteners, welding, and/or the like, and accordingly the second crossmember 12 may connect the pair of side sills 30 in the transverse direction of the vehicle.

Both end portions of each of the crossmembers 11 and 12 may be supported with respect to the pair of side sills 30 through a pair of support brackets 33, respectively. That is, each end portion of each of the crossmembers 11 and 12 may be more firmly supported and joined to the corresponding side sill 30 through the corresponding support bracket 33.

Referring to FIG. 4, each support bracket 33 may connect a bottom surface of each of the crossmembers 11 and 12 adjacent to an end face of each of the crossmembers 11 and 12 to the inboard side surface of the corresponding side sill inner 31. Accordingly, the pair of support brackets 33 may stably support a vertical load acting on the crossmembers 11 and 12 and the side sills 30.

Referring to FIG. 4, each support bracket 33 may include a first fixed surface 33a fixed to each of the crossmembers 11 and 12, and a second fixed surface 33b fixed to the side sill inner 31. The first fixed surface 33a may be perpendicular to the second fixed surface 33b.

Specifically, the first fixed surface 33a may be horizontally flat to match the bottom surface of each of the crossmembers 11 and 12, and the first fixed surface 33a may be fixed to the bottom surface of each of the crossmembers 11 and 12 adjacent to each end face thereof using fasteners, welding, and/or the like. The second fixed surface 33b may be vertically flat to match the inboard side surface of the side sill inner 31, and the second fixed surface 33b may be fixed to the inboard side surface of the side sill inner 31 using fasteners, welding, and/or the like. Accordingly, the bottom surface of each of the crossmembers 11 and 12 adjacent to each end face thereof may be firmly supported with respect to the side sill inner 31 of the corresponding side sill 30 through the corresponding support bracket 33.

In addition, each support bracket 33 may further include an inclined surface 33c extending obliquely between the first fixed surface 33a and the second fixed surface 33b, and each of the crossmembers 11 and 12 may be stably supported with respect to the side sill 30 through the inclined surface 33c of the support bracket 33.

According to an exemplary embodiment, the first crossmember 11 and the second crossmember 12 may be seat crossmembers on which vehicle seats are mounted using brackets, and the first crossmember 11 and the second crossmember 12 may support the vehicle seats.

The first crossmember 11 and the second crossmember 12 may connect the pair of side sills 30 in the transverse direction of the vehicle in the middle of the center frame module 10 so that the first crossmember 11 and the second crossmember 12 may have relatively high static stiffness and dynamic stiffness. Accordingly, the first crossmember 11 and the second crossmember 12 may serve as stiffness members for enhancing static stiffness and dynamic stiffness of the vehicle body.

The first crossmember 11 and the second crossmember 12 may have an angular cross section or a circular cross section with a cavity defined therein, and accordingly the first crossmember 11 and the second crossmember 12 may have a closed cross section. According to an exemplary embodiment, the first crossmember 11 and the second crossmember 12 may be made of a high-tensile strength steel plate such as SPFC1180Y through hot stamping, hot forming, press hardening, and/or roll forming. Accordingly, the high-strength crossmembers 11 and 12 may improve side crashworthiness of the side sills 30, thereby safely protecting the battery and the passenger compartment in the event of a side collision of the vehicle.

The plurality of side longitudinal members 13a and 13b, may be connected perpendicularly to the plurality of crossmembers 11 and 12 so that static stiffness and dynamic stiffness of the center frame module 10 may be increased. In particular, during a side collision of the vehicle, an impact load may be transferred along the plurality of crossmembers 11 and 12 through the side sill 30 in the transverse direction of the vehicle, and the impact load may be transferred through the plurality of side longitudinal members 13a and 13b connected perpendicularly to the plurality of crossmembers 11 and 12 in the longitudinal direction of the vehicle so that the load may be uniformly distributed in the center frame module 10.

The plurality of side longitudinal members 13a and 13b may include a pair of first side longitudinal members 13a extending from the first crossmember 11 to the second crossmember 12, and a pair of second side longitudinal members 13b extending from the second crossmember 12 toward the rear of the vehicle.

The pair of first side longitudinal members 13a may be spaced apart from each other in the transverse direction of the vehicle, and each first side longitudinal member 13a may extend in the longitudinal direction of the vehicle. Each first side longitudinal member 13a may be located between a central longitudinal axis of the vehicle and the side sill 30. A front end of the first side longitudinal member 13a may be joined to the first crossmember 11 using fasteners, welding, and/or the like, and a rear end of the first side longitudinal member 13a may be joined to the second crossmember 12 using fasteners, welding, and/or the like.

The pair of second side longitudinal members 13b may be spaced apart from each other in the transverse direction of the vehicle, and each second side longitudinal member 13b may extend in the longitudinal direction of the vehicle. Each second side longitudinal member 13b may be located between the central longitudinal axis of the vehicle and the side sill 30. A front end of the second side longitudinal member 13b may be joined to the second crossmember 12 using fasteners, welding, and/or the like, and a rear end of the second side longitudinal member 13b may be joined to the intermediate structure 20 using fasteners, welding, and/or the like.

Each second side longitudinal member 13b may be aligned with the corresponding first side longitudinal member 13a in the longitudinal direction of the vehicle. In particular, the front end of the second side longitudinal member 13b and the rear end of the corresponding first side longitudinal member 13a may face each other with the second crossmember 12 interposed therebetween. A longitudinal axis of the second side longitudinal member 13b may be aligned with a longitudinal axis of the corresponding first side longitudinal member 13a.

Referring to FIGS. 1 and 2, the front structure 6 may be connected to the center frame module 10, the pair of front pillars 5a, and the pair of front extension portions 3a. The front structure 6 may include a pair of front side members 61, a pair of fender upper members 62 located above the pair of front side members 61, respectively, a bumper back beam 63 connecting front ends of the pair of front side members 61, a front end module 64 connected to the pair of front side members 61 and the pair of fender upper members 62, and an upper crossmember 65 connecting the pair of front pillars 5a.

The pair of front side members 61 may be spaced apart from each other in the transverse direction of the vehicle on the front of the vehicle, and each front side member 61 may extend in the longitudinal direction of the vehicle. According to an exemplary embodiment, the front side member 61 may be made of a mass-produced steel pipe having an angular cross section or a circular cross section with a cavity defined therein, and accordingly the front side member 61 may have a closed cross section. For example, the mass-produced steel pipe may be SGH400, SGH490, or the like.

The pair of fender upper members 62 may be spaced apart from each other in the transverse direction of the vehicle, and each fender upper member 62 may extend in the longitudinal direction of the vehicle. Each fender upper member 62 may be upwardly spaced apart from the corresponding front side member 61.

The bumper back beam 63 may extend in the transverse direction of the vehicle, and the bumper back beam 63 may connect the front ends of the pair of front side members 61. Each end portion of the bumper back beam 63 may be joined to the front end of the corresponding front side member 61. According to an exemplary embodiment, the bumper back beam 63 may be made of a high-tensile strength steel plate through hot stamping, hot forming, press hardening, and/or roll forming.

The front end module 64 may be a frame supporting a heat exchanger such as a radiator, a condenser, and an intercooler.

The upper crossmember 65 may extend in the transverse direction of the vehicle, and each end portion of the upper crossmember 65 may be joined to the corresponding front pillar 5a. Referring to FIGS. 1 and 2, a pair of strut bars 66 may extend from the upper crossmember 65 to the pair of fender upper members 62, respectively, and the pair of strut bars 66 may be spaced apart from each other in a longitudinal direction of the upper crossmember 65. A top end of each strut bar 66 may be joined to a portion of the upper crossmember 65 adjacent to the end portion of the upper crossmember 65, and a bottom end of each strut bar 66 may be joined to the corresponding fender upper member 62. That is, the pair of fender upper members 62 may be connected to the upper crossmember 65 through the pair of strut bars 66.

Referring to FIG. 2, the rear frame module 9 may include a pair of rear side members 91, a rear crossmember 92 connecting the pair of rear side members 91, and a rear back beam 93 connecting rear ends of the rear side members 91.

The pair of rear side members 91 may be spaced apart from each other in the transverse direction of the vehicle on the rear of the vehicle, and each rear side member 91 may extend in the longitudinal direction of the vehicle. Each rear side member 91 may extend from a rear portion of the corresponding side sill 30 to the rear of the vehicle, and a front portion of the rear side member 91 may be joined to the inboard side surface of the rear portion of the corresponding side sill 30 using fasteners, welding, and/or the like. That is, the pair of rear side members 91 may be connected to the inboard side surfaces of the pair of side sills 30, respectively. The rear crossmember 92 and the rear back beam 93 may extend in the transverse direction of the vehicle.

According to an exemplary embodiment, the rear side member 91 may be made of a mass-produced steel pipe having an angular cross section or a circular cross section with a cavity defined therein, and accordingly the rear side member 91 may have a closed cross section. For example, the mass-produced steel pipe may be SGH400, SGH490, or the like.

Referring to FIG. 1, the rear frame module 9 may be located higher than the center frame module 10, and the intermediate structure 20 may connect the center frame module 10 and the rear frame module 9.

Referring to FIG. 2, the vehicle frame 1 according to an exemplary embodiment of the present disclosure may further include a rear subframe 80 mounted on the rear frame module 9. The rear subframe 80 may include a pair of front mounting portions 81 mounted on the front portions of the pair of rear side members 91, respectively, and a pair of rear mounting portions 82 mounted on the rear portions of the pair of rear side members 91, respectively.

Referring to FIG. 1, a dash crossmember 67 may connect lower portions of the pair of front pillars 5a. The dash crossmember 67 may be mounted under a dash panel, and the dash panel may serve as a partition between a front compartment and the passenger compartment. In addition, both end portions of the dash crossmember 67 may be joined to the pair of side sills 30 using fasteners, welding, and/or the like, respectively.

Each front side member 61 may extend from the bumper back beam 63 toward the rear of the vehicle, and the front side member 61 may be connected to the dash crossmember 67. Accordingly, the dash crossmember 67 may support the pair of front side members 61. Specifically, a rear end of each front side member 61 may be joined to the dash crossmember 67 using fasteners, welding, and/or the like, and the front end of each front side member 61 may be joined to the corresponding end portion of the bumper back beam 63 using fasteners, welding, and/or the like.

Referring to FIGS. 2 and 3, the center frame module 10 may further include a front crossmember 14 located behind the dash crossmember 67, a pair of rear lower members 15 extending from the dash crossmember 67 to the front crossmember 14, and a center longitudinal member 16 extending from the dash crossmember 67 to the first crossmember 11.

The front crossmember 14 may extend in the transverse direction of the vehicle. The front crossmember 14 may be parallel to the first crossmember 11 and the second crossmember 12. The front crossmember 14 may be spaced apart from the dash crossmember 67 toward the rear of the vehicle, and be adjacent to the front end of the center frame module 10. Both end portions of the front crossmember 14 may be joined to the pair of side sills 30, respectively, and accordingly the front crossmember 14 may connect the pair of side sills 30 in the transverse direction of the vehicle.

The front crossmember 14 may have an angular cross section or a circular cross section with a cavity defined therein, and accordingly the front crossmember 14 may have a closed cross section. According to an exemplary embodiment, the front crossmember 14 may be made of a high-tensile strength steel plate such as SPFC1180Y through hot stamping, hot forming, press hardening, and/or roll forming. Accordingly, the high-strength front crossmember 14 may improve crashworthiness and stiffness of the center frame module 10, thereby safely protecting the battery and the passenger compartment in the event of a collision of the vehicle.

The pair of rear lower members 15 may be spaced apart from each other in the transverse direction of the vehicle, and each rear lower member 15 may extend in the longitudinal direction of the vehicle. According to an exemplary embodiment, the rear lower member 15 may be made of a high-tensile strength steel plate such as SPFC1470 through hot stamping, hot forming, press hardening, and/or roll forming, whereby front crash performance (crashworthiness) of the vehicle may be improved, and thus the battery and the passenger compartment may be safely protected in the event of a front collision.

The center longitudinal member 16 may extend in the central longitudinal axis of the vehicle.

According to an exemplary embodiment of the present disclosure, except for the strength members or stiffness members such as the bumper back beam 63, the first and second crossmembers 11 and 12, the rear lower member 15, and the side sill inner 31, most of the members constituting the center frame module 10, the front structure 6, and the rear frame module 9 may be made of mass-produced steel pipes. In particular, the mass-produced steel pipe may have an angular cross section or a circular cross section with a cavity defined therein, and the shape and size thereof may be standardized. Each member made of the mass-produced steel pipe may have a closed cross section. Thus, the vehicle frame 1 according to an exemplary embodiment of the present disclosure may form a relatively inexpensive and stable space frame.

Meanwhile, during the assembly of the vehicle frame 1, the pair of side sills 30 may not be preassembled to the center frame module 10, but may be loaded onto both sides of the center frame module 10 when the upper body is loaded onto the center frame module 10. Then, the pair of side sills 30 together with the upper body may be assembled to both side edges of the center frame module 10.

As illustrated in FIG. 2, each rear end of the front side member 61 may be joined to the dash crossmember 67, and the rear lower member 15 corresponding to the front side member 61 may be joined to the dash crossmember 67 so as to be aligned with the front side member 61. A front end of each rear lower member 15 may be joined to the dash crossmember 67 using fasteners, welding, and/or the like, and a rear end of each rear lower member 15 may be joined to the front crossmember 14 using fasteners, welding, and/or the like. The front end of the rear lower member 15 may face the rear end of the front side member 61 with the dash crossmember 67 interposed therebetween. That is, the front end of the rear lower member 15 may be aligned with the rear end of the front side member 61.

Referring to FIG. 2, the rear portion of the front side member 61 may extend obliquely toward the dash crossmember 67, and the rear lower member 15 may extend obliquely from the front side member 61 toward the dash crossmember 67. As the rear lower member 15 is inclined at the same angle as the rear portion of the front side member 61, the front end of the rear lower member 15 may be aligned with the rear end of the front side member 61.

Figure 6:
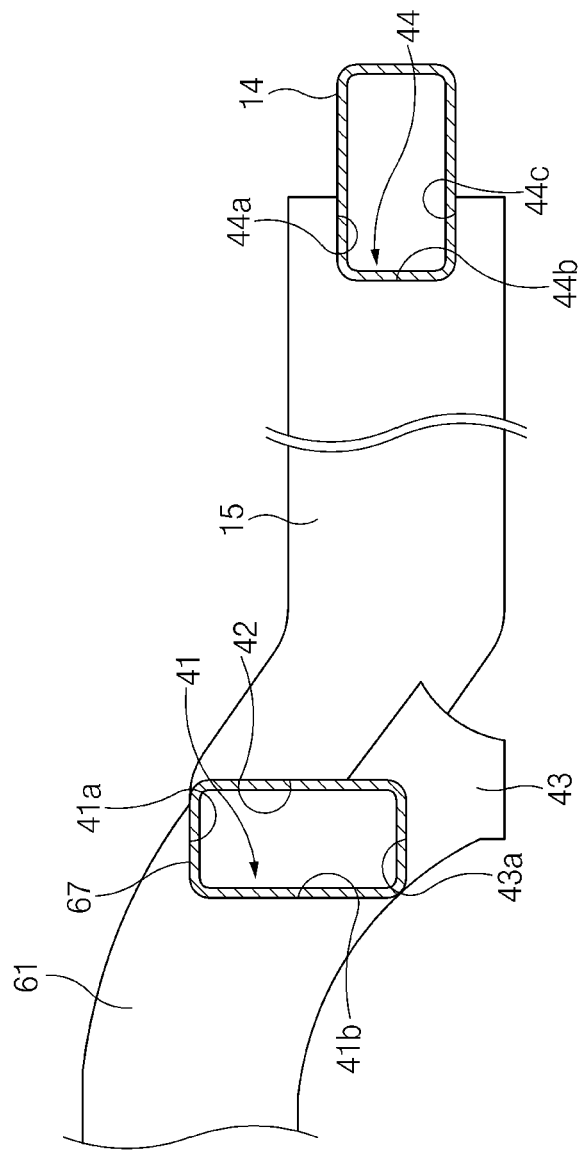
FIG. 6 illustrates a cross-sectional view, taken along line D-D of FIG. 3.

Referring to FIG. 6, the front side member 61 may have an opening 41 provided in the rear end thereof, and the dash crossmember 67 may be fitted into the opening 41 of the front side member 61.

According to an exemplary embodiment, the opening 41 may include a top engaging portion 41a joined to a top surface of the dash crossmember 67, and a front engaging portion 41b joined to a front surface of the dash crossmember 67. The top engaging portion 41a may be horizontally flat to match the top surface of the dash crossmember 67, and the top engaging portion 41a may be joined to the top surface of the dash crossmember 67 by welding ($CO_2$ welding or the like), using fasteners, and/or the like. The front engaging portion 41b may be vertically flat to match the front surface of the dash crossmember 67, and the front engaging portion 41b may be joined to the front surface of the dash crossmember 67 by welding ($CO_2$ welding or the like), using fasteners, and/or the like. Accordingly, the opening 41 of the front side member 61 may have an L-shaped cross section, and thus the rear end of the front side member 61 may be mechanically joined to the dash crossmember 67. That is, the rear end of the front side member 61 may be quite firmly joined to the dash crossmember 67 through a mechanical joint system. According to another exemplary embodiment of the present disclosure, the opening 41 of the front side member 61 may have a U-shaped cross section, and thus the rear end of the front side member 61 may be more firmly joined to the dash crossmember 67.

Referring to FIG. 6, each rear lower member 15 may have a front engaging portion 42 provided on the front end thereof. The front engaging portion 42 may be vertically flat to match a rear surface of the dash crossmember 67, and the front engaging portion 42 may be joined to the rear surface of the dash crossmember 67 by welding ($CO_2$ welding or the like), using fasteners, and/or the like. A bracket 43 may be integrally connected to the front end of the rear lower member 15 using fasteners, welding, and/or the like, and the bracket 43 may have a bottom engaging portion 43a horizontally flat to match a bottom surface of the dash crossmember 67. Accordingly, the front engaging portion 42 of the rear lower member 15 and the bottom engaging portion 43a of the bracket 43 may form an L-shaped cross section, and thus the front end of the rear lower member 15 may be mechanically joined to the dash crossmember 67. That is, the front end of the rear lower member 15 may be quite firmly joined to the dash crossmember 67 through a mechanical joint system.

As described above, the rear end of the front side member 61 and the front end of the rear lower member 15 may be joined and supported to the dash crossmember 67 through the mechanical joint system, and thus a load transferred to the front side member 61 may be uniformly distributed and transferred to the dash crossmember 67 and the rear lower member 15.

Referring to FIG. 6, each rear lower member 15 may have an opening 44 provided in the rear end thereof, and the front crossmember 14 may be fitted into the opening 44 of the rear lower member 15.

According to an exemplary embodiment, the opening 44 may include a top engaging portion 44a joined to a top surface of the front crossmember 14, a front engaging portion 44b joined to a front surface of the front crossmember 14, and a bottom engaging portion 44c joined to a bottom surface of the front crossmember 14. The top engaging portion 44a may be horizontally flat to match the top surface of the front crossmember 14, and the top engaging portion 44a may be joined to the top surface of the front crossmember 14 by welding ($CO_2$ welding or the like), using fasteners, and/or the like. The front engaging portion 44b may be vertically flat to match the front surface of the front crossmember 14, and the front engaging portion 44b may be joined to the front surface of the front crossmember 14 by welding ($CO_2$ welding or the like), using fasteners, and/or the like. The bottom engaging portion 44c may be horizontally flat to match the bottom surface of the front crossmember 14, and the bottom engaging portion 44c may be joined to the bottom surface of the front crossmember 14 by welding ($CO_2$ welding or the like), using fasteners, and/or the like. The opening 44 of the rear lower member 15 may have a U-shaped cross section, and thus the rear end of the rear lower member 15 may be mechanically joined to the front crossmember 14. That is, the rear end of the rear lower member 15 may be quite firmly joined to the front crossmember 14 through a mechanical joint system.

Referring to FIGS. 2 and 3, a front end of the center longitudinal member 16 may be joined to a central portion of the dash crossmember 67 using fasteners, welding, and/or the like, and a rear end of the center longitudinal member 16 may be joined to a central portion of the first crossmember 11 using fasteners, welding, and/or the like. The pair of rear lower members 15 may be symmetrical to each other with respect to the center longitudinal member 16.

Figure 7:
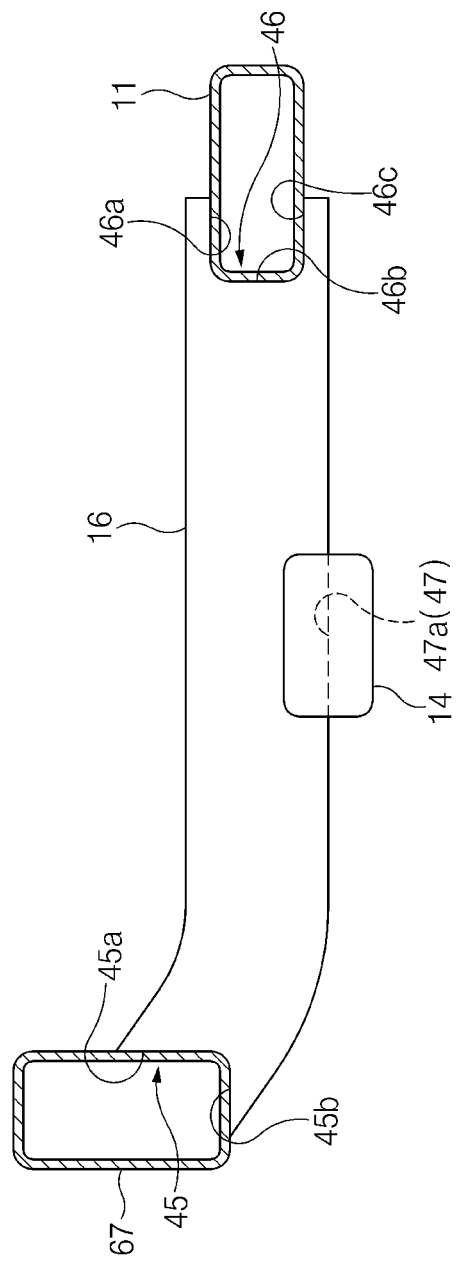
FIG. 7 illustrates a cross-sectional view, taken along line E-E of FIG. 3.

Referring to FIG. 7, the center longitudinal member 16 may have a front opening 45 provided in the front end thereof, and a rear opening 46 provided in the rear end thereof.

The dash crossmember 67 may be fitted into the front opening 45 of the center longitudinal member 16. According to an exemplary embodiment, the front opening 45 may include a front engaging portion 45a joined to the rear surface of the dash crossmember 67, and a bottom engaging portion 45b joined to the bottom surface of the dash crossmember 67. The front engaging portion 45a may be vertically flat to match the rear surface of the dash crossmember 67, and the front engaging portion 45a may be joined to the rear surface of the dash crossmember 67 by welding ($CO_2$ welding or the like), using fasteners, and/or the like. The bottom engaging portion 45b may be horizontally flat to match the bottom surface of the dash crossmember 67, and the bottom engaging portion 45b may be joined to the bottom surface of the dash crossmember 67 by welding ($CO_2$ welding or the like), using fasteners, and/or the like. Accordingly, the front opening 45 of the center longitudinal member 16 may have an L-shaped cross section, and thus the front end of the center longitudinal member 16 may be mechanically joined to the dash crossmember 67. That is, the front end of the center longitudinal member 16 may be quite firmly joined to the dash crossmember 67 through a mechanical joint system.

The first crossmember 11 may be fitted into the rear opening 46 of the center longitudinal member 16. According to an exemplary embodiment, the rear opening 46 may include a top engaging portion 46a joined to a top surface of the first crossmember 11, a rear engaging portion 46b joined to a front surface of the first crossmember 11, and a bottom engaging portion 46c joined to a bottom surface of the first crossmember 11. The top engaging portion 46a may be horizontally flat to match the top surface of the first crossmember 11, and the top engaging portion 46a may be joined to the top surface of the first crossmember 11 by welding ($CO_2$ welding or the like), using fasteners, and/or the like. The rear engaging portion 46b may be vertically flat to match the front surface of the first crossmember 11, and the rear engaging portion 46b may be joined to the front surface of the first crossmember 11 by welding ($CO_2$ welding or the like), using fasteners, and/or the like. The bottom engaging portion 46c may be horizontally flat to match the bottom surface of the first crossmember 11, and the bottom engaging portion 46c may be joined to the bottom surface of the first crossmember 11 by welding ($CO_2$ welding or the like), using fasteners, and/or the like. Accordingly, the rear opening 46 of the center longitudinal member 16 may have a U-shaped cross section, and thus the rear end of the center longitudinal member 16 may be mechanically joined to the first crossmember 11. That is, the rear end of the center longitudinal member 16 may be quite firmly joined to the first crossmember 11 through a mechanical joint system.

Referring to FIGS. 2 and 3, both end portions of the front crossmember 14 may be joined to the pair of side sills 30 using fasteners, welding, and/or the like, respectively.

Figure 8:
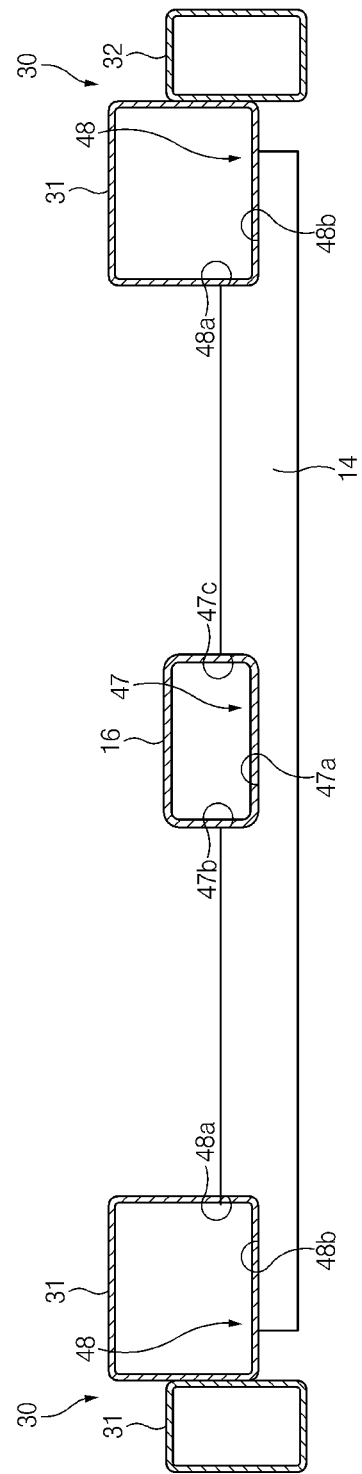
FIG. 8 illustrates a cross-sectional view, taken along line F-F of FIG. 3.

Referring to FIG. 8, the front crossmember 14 may have a pair of side openings 48 provided in both end portions thereof, respectively. The side sill inner 31 of each side sill 30 may be fitted into the corresponding side opening 48 of the front crossmember 14. According to an exemplary embodiment, each side opening 48 may include a side engaging portion 48a joined to the inboard side surface of the side sill inner 31 of the side sill 30, and a bottom engaging portion 48b joined to the bottom surface of the side sill inner 31 of the side sill 30. The side engaging portion 48a may be vertically flat to match the inboard side surface of the side sill inner 31 of the side sill 30, and the side engaging portion 48a may be joined to the inboard side surface of the side sill inner 31 of the side sill 30 by welding ($CO_2$ welding or the like), using fasteners, and/or the like. The bottom engaging portion 48b may be horizontally flat to match the bottom surface of the side sill inner 31 of the side sill 30, and the bottom engaging portion 48b may be joined to the bottom surface of the side sill inner 31 of the side sill 30 by welding ($CO_2$ welding or the like), using fasteners, and/or the like. Accordingly, the side opening 48 of the front crossmember 14 may have an L-shaped cross section, and thus each end portion of the front crossmember 14 may be mechanically joined to the side sill 30. That is, both end portions of the front crossmember 14 may be quite firmly joined to the pair of side sills 30 through a mechanical joint system.

Referring to FIG. 8, the front crossmember 14 may include a center opening 47 provided in a central portion thereof. The center longitudinal member 16 may be fitted into the center opening 47 of the front crossmember 14. According to an exemplary embodiment, the center opening 47 may include a bottom engaging portion 47a joined to a bottom surface of the center longitudinal member 16, a first side engaging portion 47b joined to a first side surface of the center longitudinal member 16, and a second side engaging portion 47c joined to a second side surface of the center longitudinal member 16. The bottom engaging portion 47a may be horizontally flat to match the bottom surface of the center longitudinal member 16, and the bottom engaging portion 47a may be joined to the bottom surface of the center longitudinal member 16 by welding ($CO_2$ welding or the like), using fasteners, and/or the like. The first side engaging portion 47b may be vertically flat to match the first side surface of the center longitudinal member 16, and the first side engaging portion 47b may be joined to the first side surface of the center longitudinal member 16 by welding ($CO_2$ welding or the like), using fasteners, and/or the like. The second side engaging portion 47c may be vertically flat to match the second side surface of the center longitudinal member 16, and the second side engaging portion 47c may be joined to the second side surface of the center longitudinal member 16 by welding ($CO_2$ welding or the like), using fasteners, and/or the like. Accordingly, the center opening 47 of the front crossmember 14 may have a U-shaped cross section, and thus the center longitudinal member 16 may be mechanically joined to the central portion of the front crossmember 14. That is, the center longitudinal member 16 may be quite firmly joined to the central portion of the front crossmember 14 through a mechanical joint system.

As set forth above, the vehicle center frame module according to exemplary embodiments of the present disclosure may use a relatively inexpensive material such as a mass-produced steel pipe, thereby significantly reducing the manufacturing cost thereof, compared to when using pressed steel materials and aluminum materials, and may significantly improve side crashworthiness of a vehicle, thereby safely protecting the battery and the passenger compartment.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle center frame module comprising:
   a pair of side sills, each side sill comprising a side sill inner having a closed cross section and a side sill outer having a closed cross section, wherein an inboard side surface of the side sill outer and an outboard side surface of the side sill inner are joined; and
   a plurality of crossmembers connecting the pair of side sills in a transverse direction of a vehicle, the crossmembers comprising a first crossmember and a second crossmember located behind the first crossmember in a longitudinal direction of the vehicle; and
   a center longitudinal member extending along a central longitudinal axis of the vehicle, the center longitudinal member having an opening in a rear end,
   wherein a central portion of the first crossmember is located in the opening of the center longitudinal member,
   wherein the center longitudinal member comprises a front opening at a front end receiving a dash crossmember, and
   wherein the front opening has an L-shaped cross section including a front engaging portion and a bottom engaging portion.

2. The vehicle center frame module according to claim 1, wherein the side sill inner comprises a material having higher strength and stiffness than a material of the side sill outer.

3. The vehicle center frame module according to claim 1, wherein the side sill inner comprises a high-tensile strength steel plate.

4. The vehicle center frame module according to claim 1, wherein a cross-sectional area of the side sill inner is greater than a cross-sectional area of the side sill outer.

5. The vehicle center frame module according to claim 1, wherein the side sill inner and the side sill outer are joined to define a stepped structure.

6. The vehicle center frame module according to claim 1, wherein a bottom surface of the side sill outer is disposed lower than a bottom surface of the side sill inner in a height direction of the vehicle.

7. The vehicle center frame module according to claim 1, wherein the side sill further comprises a rivet nut extending through the side sill inner and configured to mount a battery assembly.

8. The vehicle center frame module according to claim 7, wherein the rivet nut comprises:
   a nut body extending through the side sill inner;
   a top head disposed on a top end of the nut body; and
   a bottom head disposed on a bottom end of the nut body.

9. The vehicle center frame module according to claim 8, wherein:
   the nut body comprises internal threads on an inner circumferential surface thereof;
   the top head is supported and joined to a top surface of the side sill inner; and
   the bottom head is supported and joined to a bottom surface of the side sill inner.

10. The vehicle center frame module according to claim 1, further comprising support brackets, wherein each end portion of each crossmember is coupled to a respective one of the pair of side sills by a respective one of the support brackets.

11. The vehicle center frame module according to claim 10, wherein each support bracket comprises a first surface fixed to the respective crossmember and a second surface fixed to the side sill inner, the first surface being perpendicular to the second surface.

12. The vehicle center frame module according to claim 11, wherein each support bracket further comprises an inclined surface extending obliquely between the first surface and the second surface.

13. The vehicle center frame module according to claim 1, wherein each crossmember comprises a high-tensile strength steel plate.

14. A vehicle center frame module comprising:
   a pair of side sills, each side sill comprising a side sill inner having a closed cross section and a side sill outer having a closed cross section, wherein an inboard side surface of the side sill outer and an outboard side surface of the side sill inner are joined;
   at least two crossmembers connecting the pair of side sills in a transverse direction of a vehicle, the crossmembers comprising a first crossmember and a second crossmember located behind the first crossmember in a longitudinal direction of the vehicle;
   at least two side longitudinal members connected perpendicularly to the at least two crossmembers; and
   a center longitudinal member extending along a central longitudinal axis of the vehicle, the center longitudinal member having an opening in a rear end,
   wherein a central portion of the first crossmember is located in the opening of the center longitudinal member,
   wherein the center longitudinal member comprises a front opening at a front end receiving a dash crossmember, and
   wherein the front opening has an L-shaped cross section including a front engaging portion and a bottom engaging portion.

15. The vehicle center frame module according to claim 14, wherein the side longitudinal members comprise:
   a pair of first side longitudinal members extending from the first crossmember to the second crossmember; and
   a pair of second side longitudinal members extending from the second crossmember toward a rear of the vehicle.

16. The vehicle center frame module according to claim 15, wherein each second side longitudinal member is aligned with a corresponding first side longitudinal member in the longitudinal direction of the vehicle.

17. The vehicle center frame module according to claim 14, wherein the side sill inner comprises a material having higher strength and stiffness than a material of the side sill outer.

18. The vehicle center frame module according to claim 14, wherein the opening in the rear end of the center longitudinal member has a U-shaped cross section comprising a top engaging portion, a rear engaging portion, and a bottom engaging portion for mechanically joining the center longitudinal member to the first crossmember.

19. The vehicle center frame module according to claim 14, further comprising a front crossmember located in front of the first crossmember, wherein the center longitudinal member extends from the first crossmember to the front crossmember, wherein the front crossmember includes a center opening configured to receive the center longitudinal member, and wherein the center opening has a U-shaped cross section.

20. A vehicle center frame module comprising:
- a pair of side sills, each side sill comprising a side sill inner having a closed cross section and a side sill outer having a closed cross section, wherein an inboard side surface of the side sill outer and an outboard side surface of the side sill inner are joined;
- at least two crossmembers connecting the pair of side sills in a transverse direction of a vehicle, the crossmembers comprising a first crossmember and a second crossmember located behind the first crossmember in a longitudinal direction of the vehicle;
- at least two side longitudinal members connected perpendicularly to the at least two crossmembers; and
- a center longitudinal member extending along a central longitudinal axis of the vehicle, the center longitudinal member having an opening in a rear end,
- wherein a central portion of the first crossmember is located in the opening of the center longitudinal member,
- wherein the opening in the rear end of the center longitudinal member has a U-shaped cross section comprising a top engaging portion, a rear engaging portion, and a bottom engaging portion for mechanically joining the center longitudinal member to the first crossmember.

* * * * *